United States Patent
Rohde et al.

(10) Patent No.: US 9,173,013 B2
(45) Date of Patent: Oct. 27, 2015

(54) METHOD AND DEVICE FOR ADJUSTING A LASER IN AN OPTICAL NETWORK

(75) Inventors: Harald Rohde, Munich (DE); Sylvia Smolorz, Munich (DE)

(73) Assignee: Xieon Networks S.a.r.l., Luxembourg (LU)

(*) Notice: Subject to any disclaimer, the term of this patent is extended or adjusted under 35 U.S.C. 154(b) by 14 days.

(21) Appl. No.: 13/391,439

(22) PCT Filed: Aug. 21, 2009

(86) PCT No.: PCT/EP2009/060834
§ 371 (c)(1),
(2), (4) Date: Mar. 28, 2012

(87) PCT Pub. No.: WO2011/020515
PCT Pub. Date: Feb. 24, 2011

(65) Prior Publication Data
US 2012/0183297 A1    Jul. 19, 2012

(51) Int. Cl.
*H04J 14/02* (2006.01)
*H04Q 11/00* (2006.01)
*H04B 10/073* (2013.01)
*H04B 10/272* (2013.01)
*H04J 3/06* (2006.01)

(52) U.S. Cl.
CPC ....... *H04Q 11/0067* (2013.01); *H04B 10/0731* (2013.01); *H04B 10/272* (2013.01); *H04J 3/0667* (2013.01); *H04Q 2011/0079* (2013.01); *H04Q 2011/0088* (2013.01)

(58) Field of Classification Search
None
See application file for complete search history.

(56) References Cited

U.S. PATENT DOCUMENTS

| 7,522,845 B2 | 4/2009 | Lautenschlager | |
| 2008/0089699 A1* | 4/2008 | Li et al. | 398/197 |
| 2008/0267627 A1* | 10/2008 | Effenberger | 398/72 |
| 2011/0236017 A1* | 9/2011 | Ohlen | 398/34 |

FOREIGN PATENT DOCUMENTS

| CN | 1722649 | 1/2006 |
| CN | 1925370 | 3/2007 |
| EP | 1 617 532 A1 | 1/2006 |

OTHER PUBLICATIONS

Suzuki et al., "A Multi-wavelength Stabilization Technique Based on a Local Minimum Search Using a Shared Reflective Etalon Filter for Coexistence-type WDM-PON", ECOC2008, ECOC, Brussels, Sep. 21-25, 2008, ECOC, Brusels Expo, Belgium, Sep. 21, 2008, XP001524803, ISBN: 978-1-4244-2228-9.

* cited by examiner

Primary Examiner — Ken Vanderpuye
Assistant Examiner — Merlin Brito Peguero
(74) Attorney, Agent, or Firm — Nelson Mullins Riley & Scarborough LLP

(57) ABSTRACT

A method and a device for adjusting a laser in an optical network. At least one alive message is transmitted from a first optical component towards a second optical component. A confirmation message is transmitted from the second optical component to the first optical component determining the wavelength of the laser to be used based on the alive message received by the second optical component. Furthermore, an optical communication system is provided with an optical element.

13 Claims, 3 Drawing Sheets

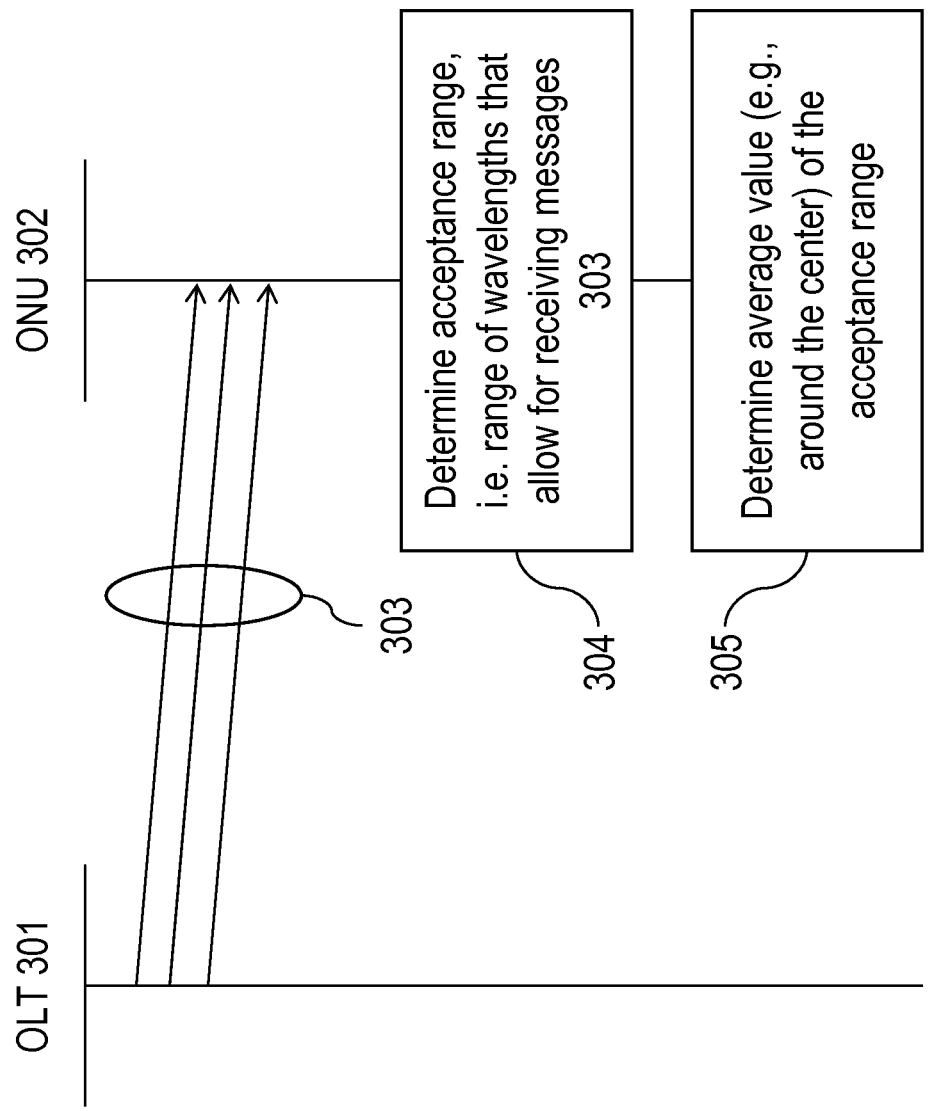

METHOD AND DEVICE FOR ADJUSTING A LASER IN AN OPTICAL NETWORK

BACKGROUND OF THE INVENTION

Field of the Invention

The invention relates to a method and to a device for adjusting a (tunable) laser in an optical network.

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

Several PON types have been standardized and are currently being deployed by network service providers worldwide. Conventional PONS distribute downstream traffic from the optical line terminal (OLT) to optical network units (ONUs) in a broadcast manner while the ONUs send upstream data packets multiplexed in time to the OLT. Hence, communication among the ONUs needs to be conveyed through the OLT involving electronic processing such as buffering and/or scheduling, which results in latency and degrades the throughput of the network.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers of around 1550 nm. Dense WDM uses the same transmission window but with denser channel spacing. Channel plans vary, but a typical system may use 40 channels at 100 GHz spacing or 80 channels with 50 GHz spacing. Some technologies are capable of 25 GHz spacing. Amplification options enable the extension of the usable wavelengths to the L-band, more or less doubling these numbers.

Current WDM PON proposals use arrayed waveguide gratings (AWGs) or some other wavelength selective element to distribute only a single wavelength to a single customer or a group of customers.

In a WDM PON concept, tunable lasers are used as upstream source for the ONUs, wherein the upstream wavelength has to be determined in order to pass the AWG.

At present, tunable lasers have a pre-determined wavelength selection, i.e. when being produced, the laser is characterized and an individual table for each single laser contains parameters to set the laser to a given wavelength. This characterization process results in a significant portion of tunable laser costs. Also, in order to provide a reference signal for this calibration, wavelength selective elements, such as etalon filters with associated monitor diodes, have to be added to the laser platform. This further increases the costs of the laser as additional components and assembly steps are required.

The problem to be solved is to overcome the disadvantages stated above and allow for an efficient utilization of a tunable laser.

BRIEF SUMMARY OF THE INVENTION

This problem is solved according to the features of the independent claims. Further embodiments result from the depending claims.

In order to overcome this problem, a method for adjusting a laser in an optical network, in particular in a component or element of the optical network, is suggested (a) wherein at least one alive message is transmitted from a first optical component towards a second optical component;

(b) wherein a confirmation message is transmitted from the second optical component to the first optical component determining the wavelength of the laser to be used based on the alive message received by the second optical component.

The laser is a tunable laser providing a wavelength that can be adjusted at or by the first optical component. The laser may be deployed at or with the first optical component.

It is noted that the first optical component may be an optical network unit (ONU) or an optical line terminal (OLT). For example, if the first optical component is an ONU, the second optical component is an OLT and if the first optical component is an OLT, the second optical component is an ONU.

Advantageously, the first optical component's laser can be adjusted dynamically to the conditions of the optical network and does not have to be produced in a way that it precisely provides a particular wavelength. Instead, the laser is dynamically tuned to the wavelength that allows for data transmission. In case the laser (over time) changes its wavelength, e.g., due to temperature influences, it can be readjusted.

The alive message may be a message sent continuously and/or iteratively that indicates to the second optical component that the first optical component is active. In case the second optical component receives the first optical component's alive message, it sends the confirmation message that the current wavelength utilized by the laser of the first optical component can be used for data transmission purposes.

It is noted that the first optical component conveys alive messages at varying wavelengths, i.e. alive messages are sent when the laser is adjusted to different wavelengths. In other words, the range of wavelengths is being scanned by producing alive messages at different wavelengths.

Hence, the first optical component after having received the control signal may emit alive messages at different wavelengths. Several such alive messages may be conveyed via different wavelengths towards the second optical component until a suitable wavelength is found. It is noted that albeit being conveyed towards the second optical component, a portion of the alive messages may not pass an intermediate optical component, e.g., a wavelength filter between the first optical component and the second optical component. A suitable wavelength for the laser is found when the second optical component receives an alive message and indicates via said confirmation message to the first optical component that this current wavelength can be used.

According to an embodiment, the laser is adjusted to different wavelengths and several alive messages are sent from the first optical component to the second optical component at such different wavelengths.

Hence, the first optical component "scans" the second optical component by emitting alive messages at different wavelengths.

Such scanning is advantageously provided at the sender (here the first optical component). The sender receives the confirmation message in case the receiver was able to detect the alive message. The receiver may have in particular detected at least one alive message from the sender or an alive message with a power level that reaches and/or exceeds a predetermined threshold. Hence, the confirmation message from the second optical component may be emitted in case the alive message detected shows a sufficient degree of power (or signal-to-noise ratio or the like).

Pursuant to an embodiment, prior to step (a) a control signal is conveyed towards the first optical component.

Hence, the control signal may be a trigger for the first optical component to emit the alive messages and thus the laser of the first optical component (e.g., the ONU) may (successively) be set to a wavelength that is successfully received by the second optical component (e.g., the OLT). Then, upstream traffic from the first optical component to the second optical component is feasible.

In a next embodiment, the method comprises the following steps:
   several alive messages are conveyed towards the first optical component;
   the first optical component determines an acceptance interval based on such alive messages;
   a wavelength is chosen by the first optical component within this acceptance interval.

In this scenario, the second optical (e.g., the OLT) component conveys alive messages towards the first optical component (e.g., the ONU).

The alive message may be a message sent continuously and/or iteratively that indicates to the first optical component that the second optical component is active.

The wavelength chosen may be a wavelength in or around the middle of said acceptance interval.

Said acceptance interval can be determined by the first optical component by adjusting its laser to different wavelengths and scanning for the alive messages. The acceptance interval allows reception of the alive message sent. If the reception is no longer possible due to the laser's wavelength selected, the limit of the acceptance interval may be reached. It is noted that at the border of the acceptance interval, a quality or level of reception can be determined to define whether or not a particular wavelength still falls within the acceptance interval.

The acceptance interval can be determined by scanning (i.e. varying the wavelength of the laser) from a low to a high wavelength or the other way round.

By setting the wavelength in or around the center of the acceptance interval, the wavelength of the laser may drift in both directions until reaching the border of the acceptance interval. This provides an efficient implementation of a safety margin.

Pursuant to another embodiment, the control signal is conveyed in downstream direction from an optical access point, in particular an optical line terminal.

In another embodiment, a reception power level is monitored and a control message is sent towards the first optical component in case the power level reaches and/or exceeds a predetermined threshold.

Such monitoring and sending of the control message can be conducted by the second optical component.

In a further embodiment, the first optical component tunes its laser pursuant to the control message received.

Hence, an efficient mechanism to compensate any drift, e.g., due to aging or temperature change, is provided. Preferably, the OLT may convey such control message to an ONU once it has determined that the power level of the signal received deteriorates.

It is also an embodiment that the control signal is received by a receiver susceptible to a broad spectrum.

Such receiver can be a photo diode at the first optical component.

According to an embodiment, the first optical component is an optical network unit (ONU).

According to another embodiment, the first optical component tunes its laser to an extreme value of an acceptance range.

Hence, the first optical component may adjust its laser towards a minimum or a maximum wavelength of the wavelengths that can be utilized for conveying traffic towards the OLT. This extreme value can be utilized as a starting point for scanning a range of wavelengths, e.g., varying the laser's wavelength towards the respective other extreme value.

The problem stated above is also solved by an optical element comprising
   a tunable laser,
   a processing unit that is arranged
      for transmitting alive messages towards a second optical component;
      for receiving a confirmation message from the second optical component;
      for using the wavelength of the tunable laser that corresponds to the confirmation message received.

It is noted that the processing unit may be or comprise optical and/or electrical means. It may in particular comprise a processor, optical elements, hardwired circuits or the like.

The further embodiments described above apply to the optical elements accordingly.

In yet another embodiment the processing unit of the optical element is arranged for receiving a control signal prior to transmitting said alive messages towards a second optical component.

According to a next embodiment, the processing unit can be arranged
   for determining an acceptance interval based on alive messages received;
   for determining a wavelength to be used for the tunable laser within said acceptance interval.

Hence, the optical element may utilize alive messages received from the second optical component to determine the acceptance interval.

The problem stated above is also solved by an optical element that comprises a processing unit that is arranged such that the steps described above are executable thereon.

Pursuant to yet an embodiment, the optical element is or is associated with an OLT or an ONU.

The problem stated supra is further solved by an optical communication system comprising at least one optical element as described herein.

Embodiments of the invention are shown and illustrated in the following figures:

BRIEF DESCRIPTION OF THE SEVERAL VIEWS OF THE DRAWING

FIG. 3 shows a schematic message sequence chart between an OLT and an ONU that visualizes an option, according to which an additional centering step within an acceptance range of wavelengths can be performed.

DESCRIPTION OF THE INVENTION

This approach suggested uses tunable lasers without any need for their prior characterization. In other words, the absolute wavelength of the laser may be unknown, albeit the laser can be utilized in an efficient manner.

Figure 1:
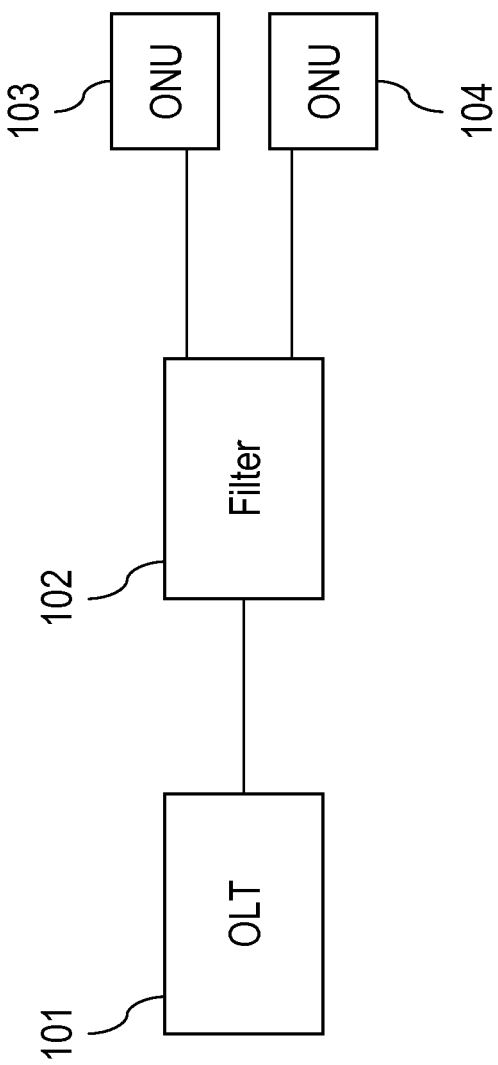
FIG. 1 shows a schematic scenario with an OLT connected via a wavelength filter towards several ONUs.

FIG. 1 shows a schematic scenario with an OLT 101 connected via a filter 102 (e.g., a wavelength filter or an AWG) towards several ONUs 103, 104. A direction from the OLT 101 towards the ONU 103, 104 is referred to as a downlink or down-stream direction, whereas the opposite direction from the ONU 103, 104 towards the OLT 101 is referred to as uplink or upstream direction.

The solution provided in particular suggests using free-running tunable lasers for an upstream direction, wherein wavelength calibration of the laser is provided or conducted by the OLT.

Figure 2:
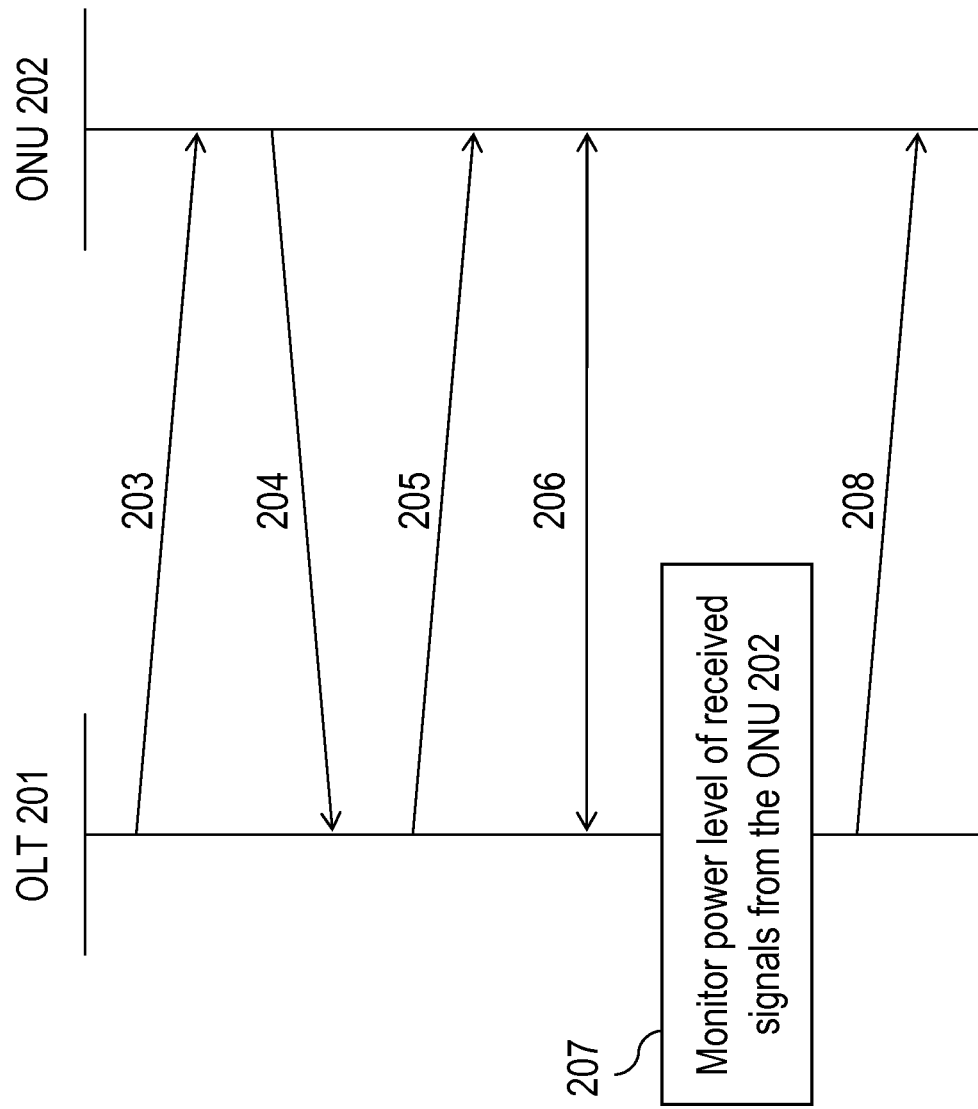
FIG. 2 shows a schematic message sequence chart between an OLT and an ONU, wherein the OLT sends a control signal downstream towards an ONU thereby notifying the ONU to tune is laser to the correct wavelength.

FIG. 2 shows a schematic message sequence chart between an OLT 201 and an ONU 202. The OLT 201 sends a control signal 203 downstream towards an ONU thereby notifying said attached ONU 202 to tune its laser to the correct wavelength. This control signal 203 can be received by the ONU 202 independently of a particular wavelength, since typical photodiode receivers have a broad sensitivity range, usually more than 200 nm.

In upstream direction, the OLT 201 may receive no particular response from the ONU 202 upon startup, as the tunable laser of the ONU 202 may most likely emit signals on the wrong wavelength so that the wavelength selective splitter blocks this upstream transmission (over the wrong wavelength).

When the ONU 202 receives the control signal 203 indicating that the ONU needs to tune itself, the ONU 202 may tune its laser to one of the extreme values available throughout the tuning range, i.e. a minimum wavelength or a maximum wavelength. Then, the ONU 202 may initiate a wavelength scan (preferably conducted with a slow scanning speed) thereby (e.g., continuously and repeatedly) sending a message 204 indicating to the OLT 201 that the ONU "is alive". Such message 204 is also referred to as "I am alive"-message.

When the wavelength lies within an acceptance range of the respective port of the wavelength selective filter at the splitter site, upstream communication passes the selective filter and is conveyed towards the OLT 201. The OLT 201 responds with a "STOP SCANNING" message 205 indicating that the ONU 202 is now tuned to the correct wavelength and both OLT and ONU may negotiate the remaining connection parameters 206.

As an alternative, the approach suggested also works without the control signal 203 first sent from the OLT 201 to the ONU 202. In this scenario, the ONU 202 may be switched on and a said message 204 is sent from the ONU 202 towards the OLT 201. The message 204 is sent by the ONU 202 at different wavelengths until said message 205 is received. Then, the ONU 202 stops scanning and uses the current wavelength for further communication with the OLT 201.

It is noted that in a TDM environment, the control signal 203 may be or comprise a broadcast signal conveying resources (e.g., time slots) towards new ONUs. In the example shown in FIG. 2, the ONU 202 may become aware via said control signal 203 of resources to be utilized in the time division domain.

As an addition, as an option, the OLT 201 may continuously monitor the received power level from the respective ONU 202 as indicated in a step 207. If that power level decreases below a predefined threshold, the OLT 201 will send a control message 208 to the ONU 202 indicating that it is reaching the borders of the wavelength selective splitter and that the ONU 202 has to re-adjust its laser. The ONU 202 may then process such re-adjustment of its laser (not shown in FIG. 2).

FIG. 3 shows a schematic message sequence chart between an OLT 301 and an ONU 302 that visualizes an option, according to which an additional centering step can be performed. In this case, the OLT 301 may repeatedly send an "I hear you" message 303 towards the ONU 302 and the ONU 302 may scan towards shorter wavelengths, then towards longer wavelengths (or the other way round: first towards longer wavelengths, then towards shorter wavelengths) until it does no longer receive the OLT's "I hear you" message 303 (see step 304).

Then, the ONU may tune to an average value of these two extreme values of wavelengths (shortest wavelength and longest wavelengths of a frequency range that allows reception of the OLT's "I hear you" message 303—this range is also referred to as "acceptance range"). Such average value of the extreme values may be a wavelength in or around the middle of the acceptance range of the wavelength selective device (see step 305).

It is an advantage that an expensive step in the production of a tunable laser, e.g. stabilization, can be omitted thus reducing the overall costs of the system.

List Of Abbreviations:
AWG Arrayed Waveguide Grating
OLT Optical Line Terminal
ONU Optical Network Unit
PON Passive Optical Network
UDWDM Ultra Dense WDM
WDM Wavelength Division Multiplex

The invention claimed is:

1. A method for adjusting a laser of a first optical component in an optical network, the method which comprises:
    transmitting several alive messages at different wavelengths from the first optical component towards a second optical component;
    subsequently conveying at least one response message from the second optical component towards the first optical component, the at least one response message indicating that at least some of the several transmitted alive messages at different wavelengths were heard by the second optical component;
    determining an acceptance range based on the at least one response message indicating that the at least some of the alive messages at the different wavelengths were heard by the second optical component, said acceptance range denoting a wavelength range that allows the second optical component to receive the alive messages; and
    choosing a wavelength for the laser of the first optical component within this acceptance range;
    wherein the wavelength chosen is a wavelength in or around the middle of said acceptance range.

2. The method according to claim 1, which comprises, prior to the first optical component transmitting several alive messages, conveying a control signal towards the first optical component.

3. The method according to claim 2, wherein the control signal is conveyed in a downstream direction from an optical access point.

4. The method according to claim 3, wherein the control signal is conveyed from an optical line terminal.

5. The method according to claim 3, which comprises receiving the control signal by a receiver susceptible to a broad spectrum.

6. The method according to claim 1, which further comprises monitoring a reception power level and sending a control message towards the first optical component in case the power level reaches and/or exceeds a predetermined threshold.

7. The method according to claim 6, which further comprises tuning the laser of the first optical component by the first optical component pursuant to the control message received.

8. The method according to claim 1, which further comprises tuning the laser of the first optical component by the first optical component to an extreme value of the acceptance range when starting the transmitting of the several alive messages.

9. An optical element, comprising
a tunable laser;
a processing unit configured for:
  transmitting several alive messages at different wavelengths towards a second optical component;
  receiving at least one response message from the second optical component, the at least one response message indicating that at least some of the several transmitted alive messages at different wavelengths were heard by the second optical component;
  determining an acceptance range based on the at least one response messages received, said acceptance range denoting a wavelength range that allows the second optical component to receive the alive messages; and
  determining a wavelength to be used for said tunable laser within the acceptance range;
  wherein said wavelength to be used for said tunable laser is determined as a wavelength in or around the middle of said acceptance range.

10. The optical element of claim 9, wherein said processing unit is configured to receive a control signal prior to transmitting the alive messages towards a second optical component.

11. An optical element, comprising a processing unit configured to execute thereon the method according to claim 1.

12. The optical element according to claim 11, configured as, or associated with, an optical line terminal (OLT) or an optical network unit (ONU).

13. An optical communication system, comprising one or a plurality of optical elements according to claim 9.

* * * * *